United States Patent
Collin et al.

(10) Patent No.: US 9,602,023 B2
(45) Date of Patent: Mar. 21, 2017

(54) SINGLE CHIP GRID CONNECTED SOLAR MICRO INVERTER

(71) Applicant: Semitech Semiconductor Pty Ltd, Kensington, VIC (AU)

(72) Inventors: Zeev Collin, Tustin, CA (US); F. Mathew Rhodes, Plymouth Meeting, PA (US)

( * ) Notice: Subject to any disclaimer, the term of this patent is extended or adjusted under 35 U.S.C. 154(b) by 523 days.

(21) Appl. No.: 14/058,266

(22) Filed: Oct. 20, 2013

(65) Prior Publication Data

US 2014/0112041 A1    Apr. 24, 2014

Related U.S. Application Data

(60) Provisional application No. 61/716,583, filed on Oct. 21, 2012.

(51) Int. Cl.
| | | |
|---|---|---|
| *H02M 7/44* | (2006.01) | |
| *H02J 3/38* | (2006.01) | |
| *H02M 7/48* | (2007.01) | |

(52) U.S. Cl.
CPC ............ *H02M 7/44* (2013.01); *H02J 3/383* (2013.01); *H02M 7/48* (2013.01); *Y02E 10/563* (2013.01)

(58) Field of Classification Search
None
See application file for complete search history.

(56) References Cited

U.S. PATENT DOCUMENTS

| 8,106,537 | B2 | 1/2012 | Casey | |
|---|---|---|---|---|
| 8,284,574 | B2 | 10/2012 | Chapman | |
| 8,456,865 | B1 | 6/2013 | Bianchi | |
| 2012/0161527 | A1* | 6/2012 | Casey | ............ H01L 31/02021 307/80 |
| 2013/0328403 | A1* | 12/2013 | Kaufman | ............ H02J 3/385 307/77 |

FOREIGN PATENT DOCUMENTS

KR    101063208 B1    9/2011

OTHER PUBLICATIONS

Xiaoming Yuan, Yingqi Zhang, Status and Opportunities of Photovoltaic Inverters in Grid-Tied and Micro-Grid Systems, IPEMC Aug. 2006, pp. 1-4, China.

Morgan Taylor McClure, A Modular Architecture for DC-AC Conversion, Aug. 2012, pp. 1-152, USA.

(Continued)

*Primary Examiner* — Jared Fureman
*Assistant Examiner* — Aqeel Bukhari
(74) *Attorney, Agent, or Firm* — Henry J. Cittone; Cittone & Chinta LLP

(57) ABSTRACT

The present invention provides an improved grid connected solar micro-inverter. The solar micro-inverter is provided with a single processor that performs both the functions for the control of the micro-inverter and runs the application program associated with it and implements a communication modem for connectivity to the grid or to the Internet cloud. The solar micro-inverter therefore needs only a single processor to perform both the micro-inverter control and modem communication functions, resulting in cheaper and smaller system implementation.

14 Claims, 3 Drawing Sheets

(56) References Cited

OTHER PUBLICATIONS

Hadeed Ahmed Sher, Khaled E. Addoweesh, Micro-inverters—Promising solutions in solar photovoltaics, Oct. 2012, pp. 389-400, Saudi Arabia.

R. Deepa, K. K. Poongodi, Grid-Connected Photovoltaic Power System Using Boost-Half Bridge Converter, Feb. 2013, pp. 12-17, India.

Mohamed A. Eltawil, Zhengming Zhao, Grid-connected photovoltaic power systems: Technical and potential problem—A review, Jul. 14, 2009, pp. 112-129, Egypt.

Alex Dumais, Sabarish Kalyanaraman, Grid-Connected Solar Microinverter Reference Design, Jul. 2012, pp. 1-54, USA.

John Benson York, Jr., An Isolated Micro-Converter for Next-Generation Photovoltaic Infrastructure, Mar. 29, 2013, pp. 1-167, USA.

\* cited by examiner

SINGLE CHIP GRID CONNECTED SOLAR MICRO INVERTER

CROSS-REFERENCE TO RELATED APPLICATIONS

This application claims benefit to U.S. Provisional Patent Application 61/716,583, filed Oct. 21, 2012, the disclosure of which is hereby incorporated by reference in its entirety.

FIELD OF THE INVENTION

The present invention relates to a solar micro-inverter and more particularly, to a processing system used in the solar micro-inverter.

BACKGROUND OF THE INVENTION

A conventional strings or central inverter device comprises multiple solar panels that are connected to a centralized inverter system. Solar panels are wired in series, creating a PV array, that is then connected to a string or a central inverter that converts the direct current (DC) from the PV array into an alternating current (AC). However, the performance of these conventional central inverter devices suffer from a number of disadvantages such as sub-optimal energy harvest, safety concern for DC wiring, short life, complex array design and installation, and difficulty in determining the location of performance problems.

On the contrary, a solar micro-inverter is a system that converts direct current (DC) from a single solar panel to an alternating current (AC). The electric power from several micro-inverters is combined and fed into an existing electrical grid. A solar micro-inverter offers various advantages over the conventional strings or central inverter systems. The main advantage is that even small amount of shading, debris or snow line in any one solar panel, or a panel failure do not disproportionately reduce the output of the entire array. Each micro-inverter obtains optimum power by performing maximum power point tracking for its connected panel.

The micro-inverters are located near the panel. The micro-inverters are equipped with a communication unit that enables monitoring the performance of each panel and controlling the micro-inverter for maintenance and troubleshooting purposes. The communication is typically performed using a powerline communication or a near range wireless modem. The micro-inverter controller is coupled to the powerline communication or a wireless modem using a suitable interface. The problem associated with this micro-inverter modem arrangement is that it includes redundant processing units optimized for very specific functions such as analog controller, modem and even an additional processor for Arc detection as a safety precaution, ultimately resulting in increased cost.

In light of the foregoing discussion, an improved micro-inverter arrangement is desirable whereby a single processor can implement the modem function as well as the micro-inverter control and any other computational function, and hence eliminates the need for a standalone modem and a separate controller or any other separate control or monitoring processors.

SUMMARY

The present invention provides an improved grid connected micro-inverter arrangement that utilizes a single processor for control and monitoring functions and the communication function. The single processor executes the micro-inverter control and monitoring functions, as well as an application program and a PLC and/or a low power wireless modem typically used in the micro-inverter based system. The micro-inverter utilizing this arrangement therefore needs only a single processor. This is an advantage over the prior art since a prior micro-inverter would utilize at least two processors to perform these functions. The present invention described herein has its implementation in the solar panels. However, it does not limit the scope of the described invention. Similar arrangement is applicable to light control systems and other applications that combine signal control algorithms and remote management.

The embodiments of the present invention provide a solar micro-inverter device that comprises a solar panel, a single chip micro-inverter having a controller for performing control and monitoring functions, a communication system for communicating with the grid network and a plurality of detectors. The solar panels are used for generating the power and the micro-inverter controller monitors, controls and optimizes the power generation and conversion from DC to AC by taking the input from the plurality of detectors and generating control signal patterns accordingly. The controller combines analog control and communication functions as well as any other monitoring function, such as Arc detection. The single chip micro-inverter provides a significantly higher level of integration and thereby makes the design of a micro-inverter simpler and it dramatically reduces the cost of implementation, while providing ease of maintenance. The resulting micro-inverter/PV panel combination can communicate directly with "Grid-based" communication using any one of a number of worldwide PLC or wireless standards, thereby being "Grid-tied" both in power delivery and power asset management. Moreover, due to its relative simplicity, the single-chip micro-inverter system is particularly suitable for implementation as part of the solar panel module, thus eliminating the need for a stand-alone micro-inverter that further reduces the cost and simplifies the whole PV panel array system.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE INVENTION

In the following detailed description of the embodiments of the invention, numerous specific details are set forth in order to provide a thorough understanding of the embodiments of the invention. However, it will be obvious to a person skilled in the art that the embodiments of the invention may be practiced without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variation, substitutions and equivalents will be apparent to those skilled in the art without parting from the spirit and scope of the invention.

A solar micro-inverter is a power conversion unit connected to the solar panel for converting direct current (DC) generated by the single solar panel to an alternating current (AC) used by the electric grid. The inverter outputs are relayed to a grid.

The present invention discloses a single-chip grid connected micro-inverter arrangement with a processor to perform both the control and monitoring functions and the communication function, resulting in cheaper, simpler and smaller system implementation. The processor controls and monitors the signals necessary to implement the micro-inverter function and runs the application program associated with the micro-inverter. The processor also implements a catalogue of communication methods using a modem and a networking protocol for establishing connectivity to the smart grid and/or to the Internet cloud. The processor has sufficient programmability to implement any common power line communication (PLC) and near-range wireless standard as well as performing maximum power point tracking and fault detection algorithm. Communication with the smart grid or the Internet cloud is typically performed using a low power line communication modem and/or a near-range low power wireless modem. These communication methods are implemented via a catalogue of low power-line communication standards including PRIME, G3, IEEE 1901.2 and Lon and/or via a catalogue of low power wireless communication standards that includes IEEE 802.15.4.

A preferred method for this invention has been described in details in the following paragraphs.

The solar micro-inverter utilizes a single control/communication chip for control and monitoring functions of the power conversion function. Additionally, the performance of the solar array can be monitored remotely or through the Internet cloud using different communication methods and standards as mentioned above. The same methods can be used to control the array remotely, such as shutting the power off in case of emergency or in a faulty panel. The communication methods that are used need to be of low power in order to preserve the power efficiency of the panel.

Figure 1:
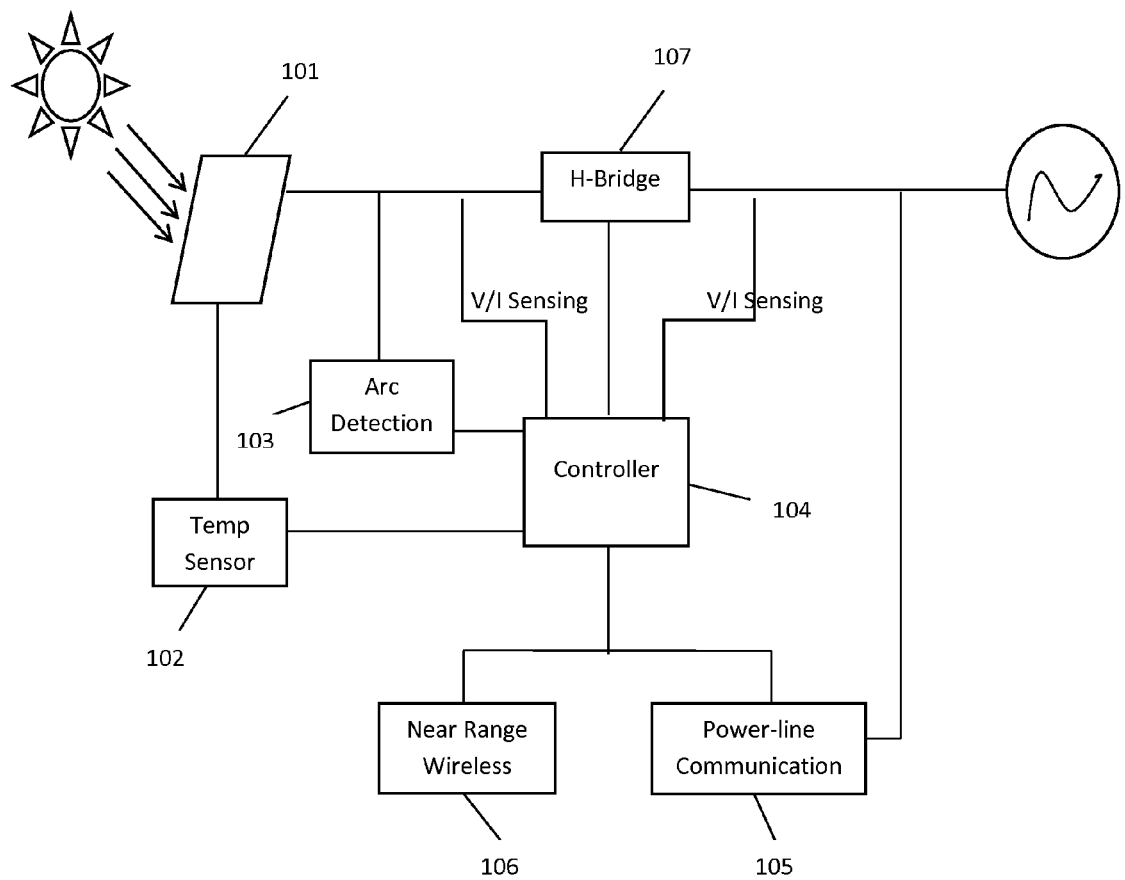
FIG. 1 is a schematic arrangement showing the conventional solar micro-inverter existing in the prior art.

FIG. 1 is a schematic arrangement showing the conventional solar micro-inverter existing in the prior art. Referring to FIG. 1, the arrangement consists of a solar panel/PV panel 101, a plurality of detectors such as a temperature sensor 102, an arc detector 103, and a controller 104 connected to a grid or the internet cloud via a powerline communication or near range wireless modem through an interface. The temperature sensor 102 and the arc detector 103 are coupled to the controller 104 and they transmit their input to the controller 104. A H-bridge circuit 107 is used to convert the DC signal outputted by the PV panel 101 to high frequency AC waveform.

The micro-inverter arrangement as shown in FIG. 1 requires a plurality of processors. The controller 104 monitors the performance of each panel and controls the functioning of the micro-inverter. In order to keep the installation simple and to avoid additional wiring, the communication is typically performed using a power line communication (PLC) 105 or near range wireless modem 106. While communication function is inherent to a micro-inverter based installation, it further increases the cost of the equipment.

The control functions of the micro-inverter are typically performed by the controller 104 with analog control functions, such as fast PWM, running maximum power point tracking algorithms and monitoring the voltage and the current and essentially implementing the micro-inverter applications. The controller 104 can be programmed so as to communicate with a remote data aggregator of some sort to make the monitored data available remotely and even accept remote control commands. This is accomplished by coupling the controller 104 to a power-line 105 or wireless modem 106 via a suitable interface. The controller 104 may be programmed to exchange information with the modem, which in turn converts the information into a suitable format for transmission to the remote source via a power line communication 105 or a wireless transmission 106.

The problem with the micro-inverter modem arrangement as shown in FIG. 1 is that it includes redundant processing units optimized for very specific functions, such as an analog controller, a modem and even an additional processor for Arc detection as a safety precaution, ultimately resulting in increased cost.

Figure 2:
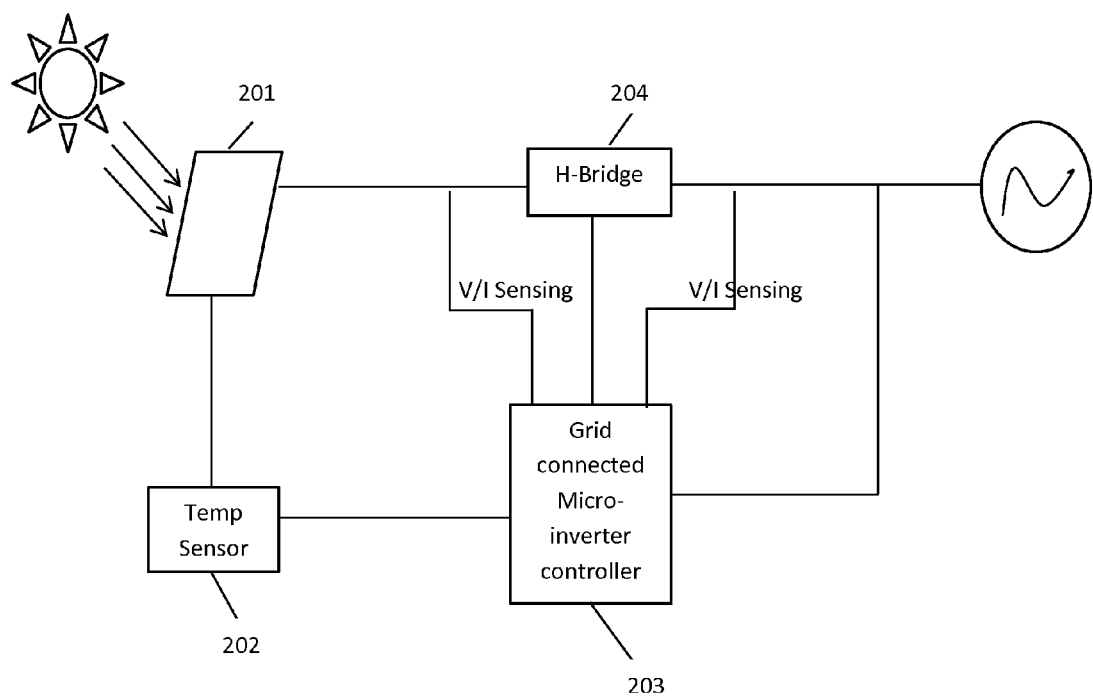
FIG. 2 is a schematic arrangement of a grid connected micro-inverter in accordance with an embodiment of the present invention.

FIG. 2 is a schematic arrangement of a grid connected micro-inverter in accordance with an embodiment of the present invention. The detector such as a temperature sensor 202 provides input to a controller 203 having a processor for processing the information received by the controller 203. The arrangement in the FIG. 2 is a uniform platform that is independent of the specific modem being used or specific signal control and maximum power point tracking algorithm. The control functions of the micro-inverter are performed by the programmable controller 203 with analog control functions namely PWM and by running maximum power point tracking algorithms and monitoring the voltage and the current and essentially implementing the micro-inverter applications. The controller 203 also performs other auxiliary functions such as monitoring the micro-inverter functioning using a plurality of sensors such as a temperature sensor 202 and an arc detector 103. The voltage and the current in the arrangement are further monitored by the controller 203 that implements the micro-inverter application via embedded analog to digital converters (ADC's). The controller 203 performs the functions of controlling and monitoring the micro-inverter and for maintaining communication with the grid or the Internet cloud or a remote location using the standard communication standard. The controller 203 is having an in-built modem that functions as an interface for communication with the grid or a remote location.

An H-Bridge circuit 207 is used to invert DC signals outputted by the photovoltaic cell 201 to a high frequency AC voltage.

The software running on the controller 203 not only includes all the algorithms necessary for micro-inverter application, but also determines the specific means of communication standard being used to exchange information with the remote location or the Internet cloud, from a catalogue of communication standards or proprietary schemes. The communication standards include any common power line communication and a near-range wireless communication. Since the micro-inverter application and the modem share the same processor, the data read by the sensors is fed directly to the modem and the control commands received by the modem go directly to the application, without the need for any inter-processor communication link as in the traditional implementations. This simplifies the system and makes the communications faster, which is especially important in time critical fault scenarios.

In an aspect of the present invention, the micro-inverter arrangement is having only a single processor that performs the control and monitoring functions as well as enabling communication with a remote server using powerline communication or near range wireless modem.

Figure 3:
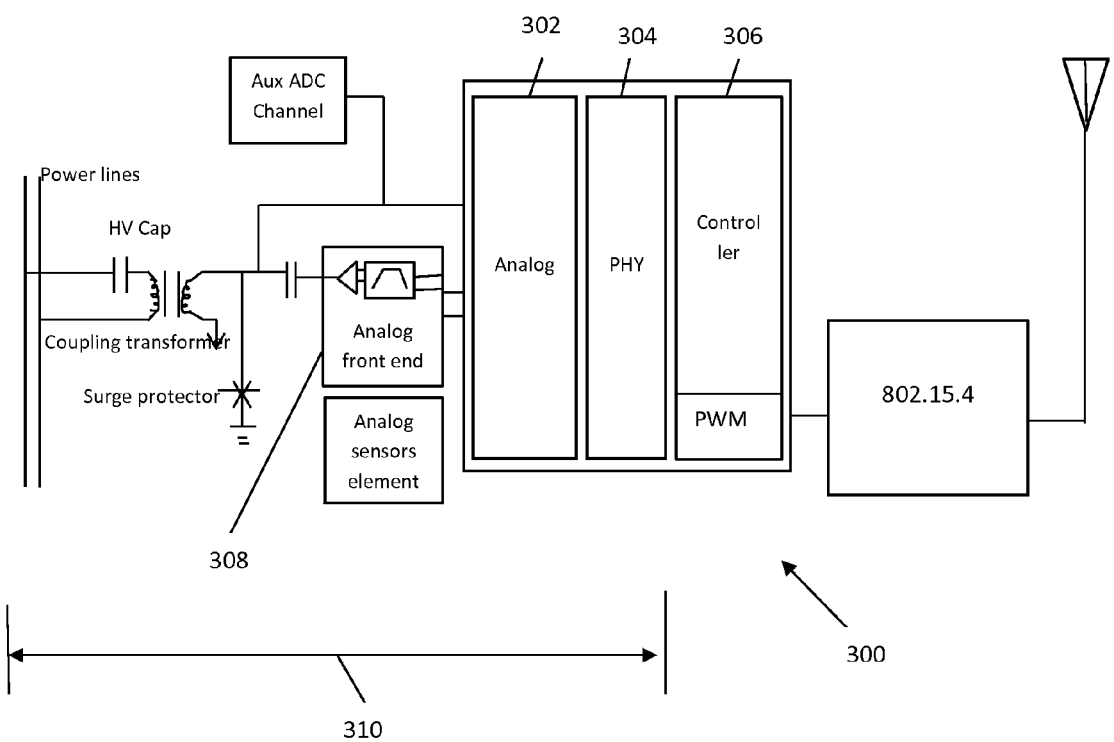
FIG. 3 is a schematic representation of the controller chip used in the solar micro-inverter in accordance with an embodiment of the present invention.

FIG. 3 is a schematic representation of a controller chip used in the solar micro-inverter in accordance with an embodiment of the present invention. Referring to FIG. 3, the controller chip 300 is capable of performing multiple algorithmic functions such as an analog monitor, control and communication functions as well as arc detection and the like. The controller chip 300 provides a significantly higher level of integration and thereby makes the design of a micro-inverter simpler and dramatically reduces the cost of implementation, while providing ease of maintenance. The resulting micro-inverter/PV panel combination can communicate directly with "Grid-based" communication using any one of a number of worldwide PLC or wireless standards, thereby being "Grid-tied" both in power delivery and in power asset management.

The controller chip 300 executes precise algorithms that are required to keep the solar panel used in a micro-inverter arrangement at the maximum power extraction point while adjusting the DC-DC and DC-AC conversion to produce the output AC voltage for the grid. The controller chip 300 is also programmed to perform the control loops necessary for all the power management functions. The PV maximum output power is dependent on the operating conditions and varies from moment to moment due to temperature, shading, cloud cover, and time of day so tracking and adjusting for this maximum power point is a continuous process. The controller chip 300 contains advanced peripherals like high precision PWM outputs and ADCs for implementing control loops. The ADC measures variables, such as the PV output voltage and current, and then adjusts the DC/DC converter and DC/AC inverter by changing the PWM duty cycle depending on the load. Complex schemes exist to track the true maximum even in partially-shaded PV modules. Real time processors are designed to read the ADC and adjust the PWM within a single clock cycle. Other peripherals include fast comparators to detect fault conditions and allow for fast reaction, such as shutting off the power to the panel. Communication capability is also included, so users and utilities can monitor the converter, report on power and operating conditions and provide firmware updates.

In an aspect of the present invention the powerline communication such as Bluetooth, Zigbee, IEEE 802.15.4 are used as networking options.

The controller chip 300 comprises an analog sensor unit 302 for sensors and converting the analog data to the digital data, a PHY unit 304 for processing the digital data, and a data link layer controller 306 for controlling the functioning of the micro-inverter. The arc detection circuit for the micro-inverter comprises an analog front end 308, an analog-to-digital converter in analog sensor unit 302 and a digital signal processor (DSP) in PHY unit 304. The analog front end 308 is a current transformer that measures the current in the string of panels. It acts as a bandpass filter across the range of frequencies to be observed and adds gain to the signal before it is sampled by the analog-to-digital converter and passed to the digital signal processor for further processing. These high-frequency signals are being fed into a comparator and checked against an operator-programmed sensitivity level selected during the test setup. If this level is exceeded, an interrupt signal is then fed into the CPU that shuts down the system.

The controller chip 300 employs a communication unit 310 for communicating with the grid or a remote location using powerline communication standards. Power line communication (PLC) leverages the existing power line infrastructure and provides a cost-effective approach for intelligent monitoring and control to many industrial applications. It makes PLC as one of the leading enabling technologies for smart grid applications ranging from smart metering, lighting control, solar, plug-in electrical vehicle home, building automation of heat and air conditioning, and security and the like. The power line communication system 310 comprises a high voltage capacitor, a coupling transformer, a surge protector, an analog front end, an operational amplifier (op-amp), a programmable gain amplifier, a 12 bit analog-to-digital converter, a universal asynchronous receiver transmitter, a clock and a micro controller unit.

The powerline communication modem system begins with a modulated signal entering the receiver stage or an active bandpass filter where the op-amp selected for the filter should provide low noise, low harmonic distortion, and low input bias as seen in FIG. 3. Scaling the received signal by using a programmable gain amplifier (PGA) allows for a wide dynamic range and optimal signal processing. The programmable gain amplifier needs to connect to the input of a 12-bit analog to digital converter (ADC) that is fast and accurate enough to properly convert it to a digital form for processing. The 12-bit ADC also includes triggering mechanisms for support of multi-frequency and phase sampling. The MCU then enables multiple modulations on the same hardware, thus eliminating the need to redesign the modem to support different modulation or standards. This makes smart and flexible platform for the power line communication implementation. Processed signals are injected back into the power grid by the PLC transmitter stage that drives a high output current. The control can be done using the PWMs support duty cycle resolution to enable more control over harmonics and reduce sample-to-output delay. The op-amp is designed for the rigorous demands of the PLC line driver. The resulting modem can directly communicate with outside systems (both wired and wireless applications) via one of the serial interface options including SPI or UART. This arrangement supports several modulations and standards on one unique design as PRIME and G3 standards.

From the power management perspective, the PLC module 310 can take its power from existing system DC rails or directly from the mains AC power it is communicating over. In the case of the latter, it needs to be filtered and converted to isolated DC power for the MCU and various support components. The controller is ideal for providing an isolated DC rail that can be used directly for the power amplifier and into a DCDC module. The addition of a linear regulator can provide a low-noise rail for use by low power components such as the MCU, PGA, op amps, USB transceivers, and any additional digital or analog components.

In another embodiment of the present invention, the micro-inverter is capable of communicating via a catalogue of low power wireless communication standards that includes IEEE 802.15.4. IEEE802.15.4 is a simple packet data protocol for lightweight wireless networks. There are 16 channels defined for the 2.4 GHz band. Network association and disassociation are supported as is AES-256 encryption, if desired.

The controller 300 implements a communication modem for connectivity to the smart grid or to the Internet cloud and performs both the micro-inverter control and modem communication function, resulting in cheaper and smaller system implementation. The analog circuitry handles modulation and demodulation of the signals. Signals from the analog front end are being fed to the phase locked loop and zero crossing detector. The phase locked loop generates an output signal whose phase is related to the phase of an input signal. The zero crossing detector switches the output between +Vsat and −Vsat (Vsat: Saturation voltage almost equal to 14V) when the input from the PLL crosses zero reference voltage. The complex signal is filtered and amplified, and then digitized by the ADCs. All the functions are performed digitally. The digitized data is fed to the DSP block and that data is stored in various memory blocks. In the DLL controller block, a CRC and AES 256 are performed on the digitized data that results into secured and error free data.

A JTAG (Joint Test Action Group) block is used for debugging ports. The JTAG block performs operations like single stepping and break pointing. The processor communicates through a standard SPI bus. The SPI allows full-duplex, synchronous, serial communication between a host processor (the master) and peripheral devices (slaves). The SPI master generates the synchronizing clock and initiates transmissions. SPI slave devices depend on the master to start and synchronize transmissions. The transmission begins when initiated by the SPI master. The data is transferred to the receiver end through PHY and MAC layers.

In another embodiment, the present invention is represented as an integrated grid connected micro-inverter controller. The embodiments comprise a PLC front end, a SM2480 processor and a Zigbee front end that is capable of performing the control, monitor and communication functions simultaneously. The present invention finds application in residential and commercial processes for power delivery and power asset management. The same arrangement is also applicable to LED lighting control, where maximum power point tracking algorithm is replaced with LED controlling algorithm using the same control, monitor and communication components.

The advantages of the present invention are implementation of a smaller solar micro-inverter arrangement for power generation that results in reduced cost. Furthermore, the solar micro-inverter arrangement is more reliable, efficient and is easy to maintain.

We claim:

1. A system for power conversion, comprising:
 a micro-inverter having a single controller chip to convert DC input from a solar panel to AC output, said single controller chip is configured:
  to receive a data having one or more controlling parameters from a plurality of sensors;
  to process the data coming from the plurality of sensors in order to perform the control and monitoring functions associated with power conversion; and
  to implement a modem for establishing connectivity and communicating with a remote communication gateway;
 an output means in the micro-inverter to relay AC output to a grid.

2. The system of claim 1 wherein the single controller chip uses a set of analog functions for performing the control and monitoring functions associated with the power conversion.

3. The system of claim 2 wherein the set of analog functions comprise one or more of fast PWM, running maximum power tracking algorithm, monitoring V-I status, and implementing micro-inverter applications.

4. The system of claim 1 wherein the remote gateway comprises an electric grid or the Internet.

5. The system of claim 1 wherein said one or more controlling parameter comprises current, voltage and temperature.

6. A solar micro-inverter comprising:
 a single controller chip to perform functions of control and monitoring, communication and detection, said single controller chip comprising: a first module to process data received from a plurality of sensors, in order to perform control and monitoring functions of the micro-inverter;
 a second module to establish connectivity and communication with a remote gateway; and
 a third module having an algorithm for the control and monitoring function and to determine a communication standard for establishing communication with the remote gateway.

7. The solar micro-inverter of claim 6, wherein the plurality of sensors comprises temperature sensor, current detector and voltage detector.

8. The solar micro-inverter of claim 6, wherein the processor uses analog functions for performing the control and monitoring functions associated with the power conversion.

9. The solar micro-inverter of claim 8 wherein the analog functions comprises fast PWM, running maximum power tracking algorithm, monitoring V-I status, and implementing micro-inverter applications.

10. The solar micro-inverter of claim 6, wherein the remote gateway comprises an electric grid or the Internet cloud.

11. The solar micro-inverter of claim 6, wherein the communication with the remote gateway is made through a PLC or a wireless modem.

12. The solar micro-inverter of claim 6, wherein the communication standards comprises powerline standards or wireless standards.

13. The solar micro-inverter of claim 12 wherein the powerline standards comprises PRIME, G3, IEEE 1901.2 and Lon.

14. The solar micro-inverter of claim 12 wherein the wireless standard is IEEE802.15.4.

* * * * *